US012462742B2

(12) United States Patent
Yoon et al.

(10) Patent No.: US 12,462,742 B2
(45) Date of Patent: Nov. 4, 2025

(54) ELECTRONIC DEVICE WITH NORMAL MODE, MULTI-FREQUENCY MODE AND REFRESH MODE

(71) Applicant: Samsung Display Co., LTD., Yongin-si (KR)

(72) Inventors: Changnoh Yoon, Yongin-si (KR); Sangan Kwon, Yongin-si (KR); Soon-Dong Kim, Yongin-si (KR); Jihye Kim, Yongin-si (KR); Taehoon Kim, Yongin-si (KR); Min-Kyu Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/666,151

(22) Filed: May 16, 2024

(65) Prior Publication Data

US 2025/0054440 A1 Feb. 13, 2025

(30) Foreign Application Priority Data

Aug. 7, 2023 (KR) ........................ 10-2023-0103137

(51) Int. Cl.
*G09G 3/32* (2016.01)
*G09G 3/3208* (2016.01)

(52) U.S. Cl.
CPC ....... *G09G 3/3208* (2013.01); *G09G 2310/08* (2013.01); *G09G 2320/0233* (2013.01); *G09G 2320/0686* (2013.01); *G09G 2330/021* (2013.01); *G09G 2340/0435* (2013.01); *G09G 2380/02* (2013.01)

(58) Field of Classification Search
CPC ............. G09G 3/3208; G09G 2310/08; G09G 2320/0233; G09G 2320/0686; G09G 2330/021; G09G 2340/0435
See application file for complete search history.

(56) References Cited

U.S. PATENT DOCUMENTS

| | | | | |
|---|---|---|---|---|
| 11,495,175 | B2 | 11/2022 | Kwon et al. | |
| 11,514,866 | B2 | 11/2022 | Kwon et al. | |
| 2021/0183290 | A1 * | 6/2021 | Sato | G09G 3/20 |

(Continued)

FOREIGN PATENT DOCUMENTS

| | | | |
|---|---|---|---|
| CN | 116229859 | A | 6/2023 |
| KR | 1020220061332 | A | 5/2022 |
| KR | 1020230084400 | A | 6/2023 |

*Primary Examiner* — Liliana Cerullo
(74) *Attorney, Agent, or Firm* — CANTOR COLBURN LLP

(57) ABSTRACT

An electronic device includes a display panel that operates in a normal mode, a multi-frequency mode, or a refresh mode, a driving controller, and a host generating and outputting a luminance information. In the multi-frequency mode, a display area defined in the display panel is divided into a first display area and a second display area, and the driving controller controls the first display area and the second display area so as to operate at different frequencies. In the normal mode, the driving controller controls the display area so as to operate at a normal frequency. In the refresh mode, the driving controller controls the display area so as to operate at the normal frequency during one frame. When the luminance information changes, the display panel operates in the refresh mode.

26 Claims, 11 Drawing Sheets

(56) References Cited

U.S. PATENT DOCUMENTS

| | | | | |
|---|---|---|---|---|
| 2021/0248957 | A1* | 8/2021 | Lee | G09G 3/3225 |
| 2022/0059030 | A1* | 2/2022 | Sang | G09G 3/3233 |
| 2022/0114956 | A1* | 4/2022 | Lee | G09G 3/3225 |
| 2023/0178003 | A1 | 6/2023 | Kim et al. | |
| 2024/0038154 | A1* | 2/2024 | Ryu | G09G 3/3233 |
| 2024/0087532 | A1* | 3/2024 | Gao | G09G 3/3208 |
| 2024/0096280 | A1* | 3/2024 | Choi | G09G 3/3233 |
| 2024/0127751 | A1* | 4/2024 | Choi | G09G 3/3233 |
| 2024/0194137 | A1* | 6/2024 | Kwon | G09G 3/3233 |
| 2024/0420612 | A1* | 12/2024 | Liao | G09G 3/2011 |

* cited by examiner

ELECTRONIC DEVICE WITH NORMAL MODE, MULTI-FREQUENCY MODE AND REFRESH MODE

This application claims priority to Korean Patent Application No. 10-2023-0103137, filed on Aug. 7, 2023, and all the benefits accruing therefrom under 35 U.S.C. § 119, the content of which in its entirety is herein incorporated by reference.

BACKGROUND

1. Field

Embodiments of the disclosure described herein relate to an electronic device in which luminance information changes.

2. Description of the Related Art

An organic light-emitting electronic device among electronic devices displays an image by an organic light-emitting diode that generates a light through the recombination of electrons and holes. The organic light-emitting electronic device provides a fast response speed and low power consumption.

The organic light-emitting electronic device includes pixels connected to data lines and scan lines. Each of the pixels generally includes an organic light-emitting diode and a circuit unit for controlling the amount of current flowing to the organic light-emitting diode. In response to a data signal, the circuit unit controls the amount of current that flows from a first driving voltage to a second driving voltage through the organic light-emitting diode. In this case, a light having luminance corresponding to the amount of current flowing through the organic light-emitting diode is generated.

As an electronic device is used in various fields, nowadays, a plurality of different images may be simultaneously displayed in a single electronic device. Accordingly, a technology for reducing power consumption of the electronic device where the plurality of images is displayed is desired.

SUMMARY

Embodiments of the disclosure provide an electronic device capable of preventing an image quality difference of a screen when luminance information changes in a multi-frequency mode.

In an embodiment of the disclosure, an electronic device includes a display panel that operates in a normal mode, a multi-frequency mode, or a refresh mode, a driving controller that controls the display panel, and a host that generates a luminance information including a luminance value of a display area defined in the display panel and outputs the luminance information to the driving controller. In the multi-frequency mode, the display area is divided into a first display area and a second display area immediately next to the first display area, and the driving controller controls the first display area and the second display area so as to operate at different frequencies. In the normal mode, the driving controller controls the display area so as to operate at a normal frequency. In the refresh mode, the driving controller controls the display area so as to operate at the normal frequency during one frame. When the luminance information changes, the display panel operates in the refresh mode.

In an embodiment, during the multi-frequency mode, the first display area may operate at a first driving frequency, and the second display area may operate at a second driving frequency lower from the first driving frequency.

In an embodiment, the first driving frequency may be identical to the normal frequency, and the second driving frequency may be lower than the normal frequency.

In an embodiment, the host may include a transmitter that outputs the luminance information and an image information, and the driving controller may include a receiver that receives the image information, and an image processor that receives the luminance information.

In an embodiment, when the luminance information changes, the image processor may change the luminance value of the display panel.

In an embodiment, in the normal mode and the refresh mode, the image information corresponding to the display area may be provided. In the multi-frequency mode, a portion of the image information may be provided to the first display area, and a remaining portion of the image information to be provided to the second display area may be held.

In an embodiment, when the luminance information changes, the image processor may drive the display panel in the refresh mode, and the image processor may receive the image information from the transmitter through the receiver.

In an embodiment, the driving controller further may include a frame memory that is connected between the receiver and the image processor, and the frame memory may store the image information and may provide the image processor with at least a portion of the image information every frame.

In an embodiment, when the luminance information changes, the image processor may drive the display panel in the refresh mode, and the image processor may receive the image information stored in the frame memory.

In an embodiment, the transmitter may provide the image information to the receiver. During the normal mode, the receiver may provide the image information to the image processor, and the image processor may drive the display panel based on the image information. During the multi-frequency mode, the receiver may transmit the image information to the frame memory, the frame memory may store the image information, and the image processor may drive the display panel based on the image information stored in the frame memory.

In an embodiment, when the luminance information changes, the image processor may drive the display panel by the refresh mode in the multi-frequency mode, and the image processor may receive the image information stored in the frame memory.

In an embodiment, the display panel may operate in units of frame, and the frame may include a first frame period, a second frame period, and a third frame period sequentially provided. The luminance information may change from a first luminance value to a second luminance value different from the first luminance value. In the first frame period, the display panel may operate in the multi-frequency mode, and the display area may display an image by the first luminance value. When the luminance information changes in the second frame period, the display panel may operate in the refresh mode, and the display area may display the image by the second luminance value. In the third frame period, the display panel may operate in the multi-frequency mode, and the display area may display the image by the second luminance value.

In an embodiment of the disclosure, an electronic device includes a display panel that operates in a normal mode, a multi-frequency mode, or a refresh mode, a driving controller that controls the display panel, and a host that generates a luminance information including a luminance value of a display area defined in the display panel and outputs the luminance information to the driving controller. In the multi-frequency mode, the display area is divided into a first display area and a second display area immediately next to the first display area, and the driving controller controls the first display area and the second display area so as to operate at different frequencies. In the normal mode, the driving controller controls the display area so as to operate at a normal frequency. In the refresh mode, the driving controller controls the display area so as to operate at the normal frequency during one frame. The luminance information includes a first luminance information having a first luminance value and a second luminance information having a second luminance value different from the first luminance value, and the display panel operating in the multi-frequency mode operates in the refresh mode when the luminance information changes from the first luminance value to the second luminance value.

In an embodiment, the host may include a transmitter that outputs the luminance information and an image information, and the driving controller may include a receiver that receives the image information, and an image processor that receives the luminance information.

In an embodiment, when the luminance information changes, the image processor may change the luminance value of the display panel.

In an embodiment, in the normal mode and the refresh mode, the image information corresponding to the display area may be provided. In the multi-frequency mode, a portion of the image information may be provided to the first display area, and a remaining portion of the image information to be provided to the second display area may be held.

In an embodiment, when the luminance information changes, the image processor may drive the display panel in the refresh mode, and the image processor may receive the image information from the transmitter through the receiver.

In an embodiment, the driving controller may further include a frame memory that tis connected between the receiver and the image processor, and the frame memory may store the image information and may provide the image processor with at least a portion of the image information every frame.

In an embodiment, when the luminance information changes, the image processor may drive the display panel in the refresh mode, and the image processor may receive the image information stored in the frame memory.

In an embodiment, during the multi-frequency mode, the first display area may operate at a first driving frequency, and the second display area may operate at a second driving frequency lower from the first driving frequency. The first driving frequency may be identical to the normal frequency, and the second driving frequency may be lower than the normal frequency.

In an embodiment of the disclosure, an electronic device includes a display panel that operates in a normal mode, a multi-frequency mode, or a refresh mode, and a driving controller that controls the display panel and receives a luminance information including a luminance value of a display area defined in the display panel. In the multi-frequency mode, the display area is divided into a first display area and a second display area immediately next to the first display area, and the driving controller controls the first display area and the second display area so as to operate at different frequencies. In the normal mode, the driving controller controls the display area so as to operate at a normal frequency. In the refresh mode, the driving controller controls the display area so as to operate at the normal frequency during one frame. When the luminance information changes, the display panel may operate in the refresh mode.

In an embodiment, during the multi-frequency mode, the first display area may operate at a first driving frequency, and the second display area may operate at a second driving frequency lower from the first driving frequency.

In an embodiment, the first driving frequency may be identical to the normal frequency, and the second driving frequency may be lower than the normal frequency.

In an embodiment, the driving controller may include a receiver that receives an image information, and an image processor that receives the luminance information.

In an embodiment, when the luminance information changes, the image processor may change the luminance value of the display panel.

In an embodiment, in the normal mode and the refresh mode, the image information corresponding to the display area may be provided. In the multi-frequency mode, a portion of the image information may be provided to the first display area, and a remaining portion of the image information to be provided to the second display area may be held.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
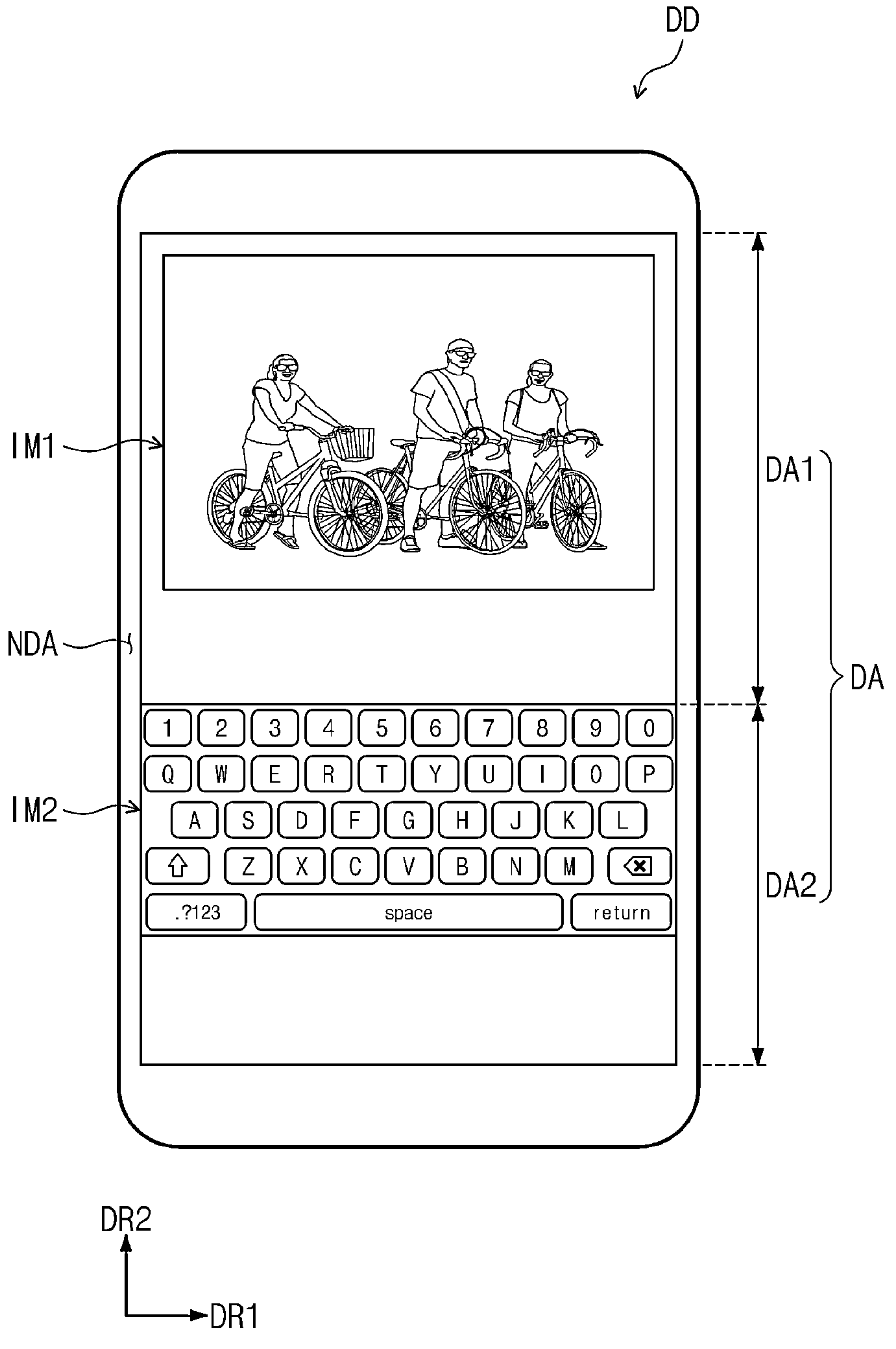
FIG. 1 is a perspective view of an embodiment of an electronic device according to the disclosure.

In the specification, the expression that a first component (or area, layer, part, portion, etc.) is "on", "connected to", or "coupled to" a second component means that the first component is directly on, connected to, or coupled to the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the invention, a first component may be referred to as a "second component", and similarly, the second component may be referred to as the "first component". The articles "a", "an", and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the disclosure will be described with reference to drawings.

FIG. 1 is a perspective view of an embodiment of an electronic device according to the disclosure.

Referring to FIG. 1, a portable terminal is illustrated in an embodiment of an electronic device DD according to the disclosure. The portable terminal may include a tablet personal computer ("PC"), a smartphone, a personal digital assistant ("PDA"), a portable multimedia player ("PMP"), a game console, a wristwatch-type electronic device, etc. However, the disclosure is not limited thereto. The disclosure may be used for small-sized and medium-sized electronic devices such as a PC, a notebook computer, a kiosk, a car navigation unit, and a camera, in addition to large-sized electronic devices such as a television or an outside billboard. The above embodiments are only illustrative, and it is obvious that the electronic device DD may be applied to any other electronic device(s) without departing from the concept of the invention.

As illustrated in FIG. 1, a display surface on which a first image IM1 and a second image IM2 are displayed is parallel to a plane defined by a first direction DR1 and a second direction DR2. The electronic device DD includes a plurality of areas that are distinguished from each other on the display surface. The display surface includes a display area DA in which the first image IM1 and the second image IM2 are displayed, and a non-display area NDA adjacent to (e.g., immediately next to) the display area DA. The non-display area NDA may be also referred to as a "bezel area". In an embodiment, the display area DA may be in the shape of a quadrangle. The non-display area NDA surrounds the display area DA. Also, although not illustrated, in an embodiment, the electronic device DD may include a partially curved shape. As a result, a portion of the display area DA may have a curved shape.

The display area DA of the electronic device DD includes a first display area DA1 and a second display area DA2. In a predetermined application program, the first image IM1 may be displayed in the first display area DA1, and the second image IM2 may be displayed in the second display area DA2. In an embodiment, the first image IM1 may be a video, and the second image IM2 may be a still image or text information having a long change period, for example.

The electronic device DD in an embodiment may drive the first display area DA1, in which the video is displayed, by a first driving frequency and may drive the second display area DA2, in which the still image is displayed, by a second driving frequency.

According to the disclosure, the first driving frequency may be the same as a normal frequency. The second driving frequency may be lower to the normal frequency. The electronic device DD may reduce power consumption by decreasing the driving frequency of the second display area DA2.

The size of each of the first display area DA1 and the second display area DA2 may be determined in advance and may be changed by an application program. In an embodiment, when the still image is displayed in the first display area DA1 and the video is displayed in the second display area DA2, the first display area DA1 may be driven by a frequency lower than the normal frequency, and the second display area DA2 may be driven by a frequency higher than or equal to the normal frequency. Also, the display area DA may be divided into three or more display areas; in this case, a driving frequency of each of the three or more display areas may be determined depending on a type (e.g., a still image or a video) of an image that is displayed therein.

Figure 2A:
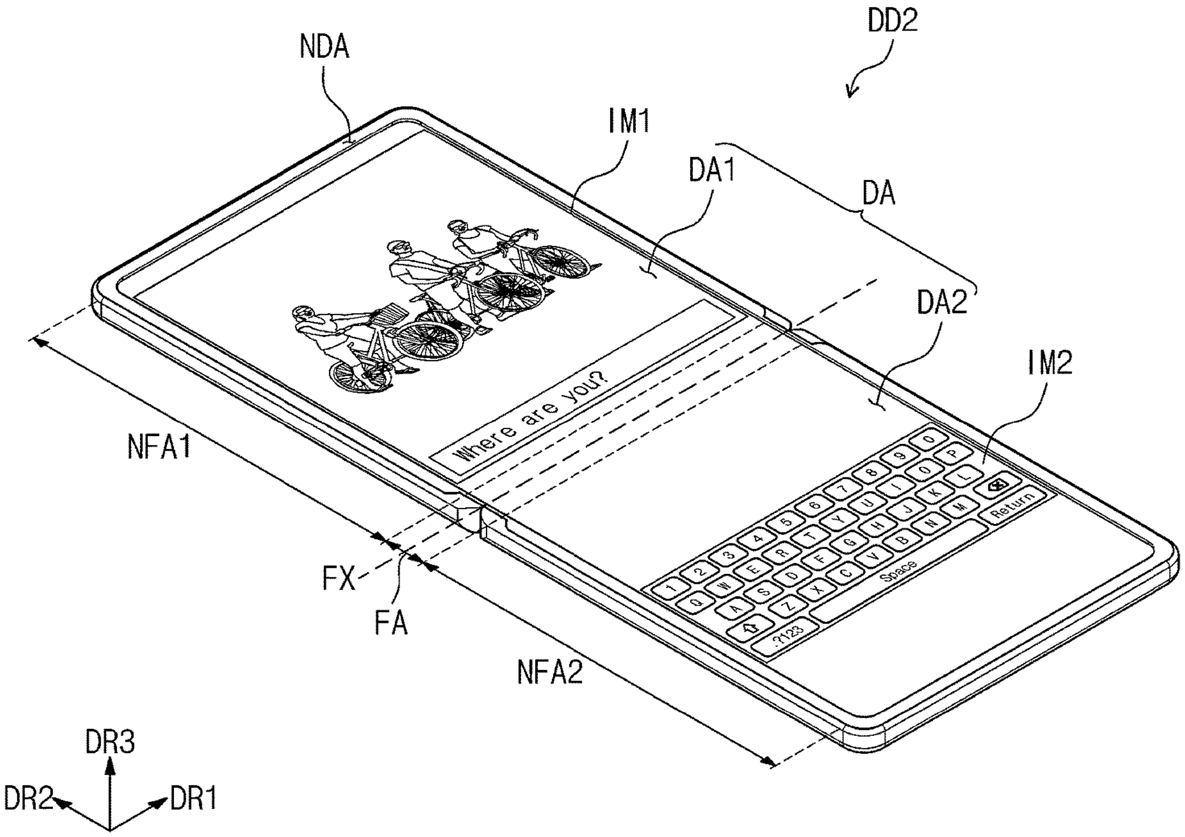
FIGS. 2A and 2B are perspective views of an embodiment of an electronic device according to the disclosure.
Figure 2B:
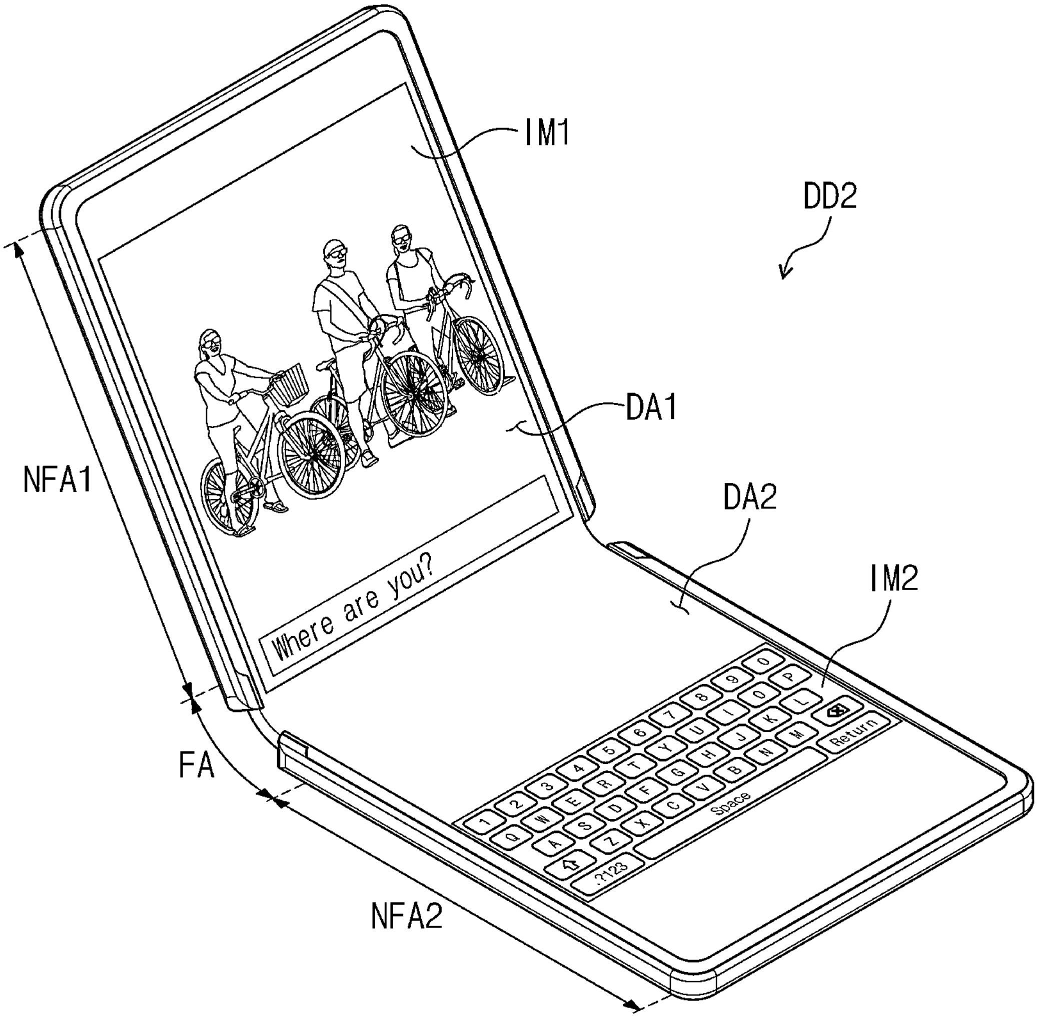

FIGS. 2A and 2B are perspective views of an embodiment of an electronic device DD2 according to the disclosure. FIG. 2A shows an unfolding state of the electronic device DD2, and FIG. 2B shows a folded state of the electronic device DD2.

As illustrated in FIGS. 2A and 2B, the electronic device DD2 includes the display area DA and the non-display area NDA. The electronic device DD2 may display an image through the display area DA. The display area DA may include the plane defined by the first direction DR1 and the second direction DR2, with the electronic device DD2 unfolded. A thickness direction of the electronic device DD2 may be parallel to a third direction DR3 intersecting the first direction DR1 and the second direction DR2. Accordingly, front surfaces (or upper surfaces) and bottom surfaces (or lower surfaces) of members constituting the electronic device DD2 may be defined with respect to the third direction DR3. The non-display area NDA may be also referred to as a "bezel area". In an embodiment, the display area DA may be in the shape of a quadrangle. The non-display area NDA surrounds the display area DA.

The display area DA may include a first non-folding area NFA1, a folding area FA, and a second non-folding area NFA2. The folding area FA may be bent about a folding axis FX extending in the first direction DR1.

When the electronic device DD2 is folded, the first non-folding area NFA1 and the second non-folding area NFA2 may face each other. Accordingly, in a state where the electronic device DD2 is fully folded, the display area DA may not be exposed to the outside, which may be also referred to as "in-folding". This is only an example, and the operation of the electronic device DD2 is not limited thereto.

In an embodiment of the disclosure, when the electronic device DD2 is folded, the first non-folding area NFA1 and the second non-folding area NFA2 may be opposite to each other, for example. Accordingly, the first non-folding area NFA1 and the second non-folding area NFA2 may be exposed to the outside in the folding state, which may be also referred to as "out-folding".

Only one of the in-folding or the out-folding of the electronic device DD2 may be possible. In an alternative embodiment, both the in-folding and the out-folding of the electronic device DD2 may be possible. In this case, the same area of the electronic device DD2, e.g., the folding area FA, may be in-folded or out-folded (or may folded inwardly and outwardly). In an alternative embodiment, a partial area of the electronic device DD2 may be in-folded, and the remaining area thereof may be out-folded.

One folding area and two non-folding areas are illustrated in FIGS. 2A and 2B, but the number of folding areas and the number of non-folding areas are not limited thereto. In an embodiment, the electronic device DD2 may include a plurality of non-folding areas, the number of which is more than two, and a plurality of folding areas; each of the plurality of folding areas may be interposed between non-folding areas adjacent to each other from among the plurality of non-folding areas, for example.

An embodiment in which the folding axis FX is parallel to the minor axis (or short side) of the electronic device DD2 is illustrated in FIGS. 2A and 2B, but the disclosure is not limited thereto. In an embodiment, the folding axis FX may extend in a direction parallel to the major axis (or long side) of the electronic device DD2, e.g., the second direction DR2, for example.

An embodiment in which the first non-folding area NFA1, the folding area FA, and the second non-folding area NFA2 are sequentially arranged in the second direction DR2 is illustrated in FIGS. 2A and 2B, but the disclosure is not limited thereto. In an embodiment, the first non-folding area NFA1, the folding area FA, and the second non-folding area NFA2 may be sequentially arranged in the first direction DR1, for example.

The plurality of display areas DA1 and DA2 may be defined in the display area DA of the electronic device DD2. Two display areas DA1 and DA2 are illustrated in FIG. 2A in an embodiment, but the number of display areas DA1 and DA2 is not limited thereto.

The plurality of display areas DA1 and DA2 may include the first display area DA1 and the second display area DA2. In an embodiment, the first display area DA1 may be an area where the first image IM1 is displayed, and the second display area DA2 may be an area in which the second image IM2 is displayed, for example. In an embodiment, the first image IM1 may be a video, and the second image IM2 may be a still image or an image (e.g., text information or the like) having a long change period, for example.

Figure 9:
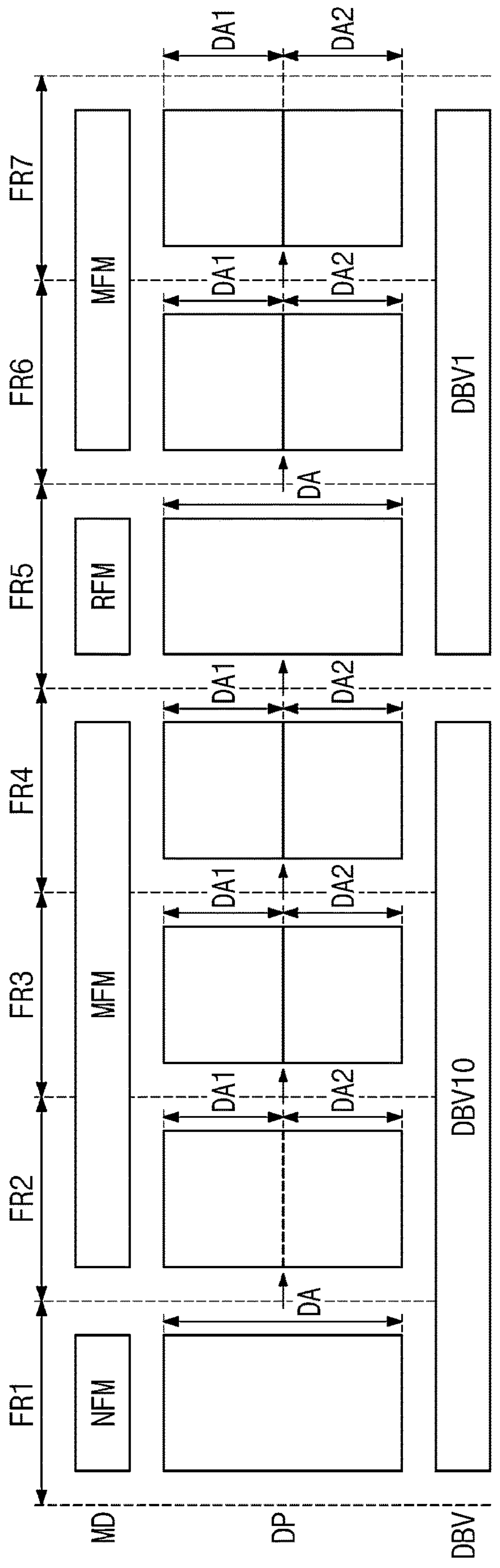
FIG. 9 is a diagram illustrating a luminance change of a first display area and a second display area in a multi-frequency mode and a normal mode.

The electronic device DD2 in an embodiment may operate differently depending on an operation mode MD (refer to FIG. 9). The operation mode MD (refer to FIG. 9) may include a normal mode NFM (refer to FIG. 3A), a refresh mode RFM (refer to FIG. 3B), and a multi-frequency mode MFM (refer to FIG. 3B).

During the normal mode NFM (refer to FIG. 3A) and the refresh mode RFM (refer to FIG. 3B), the electronic device DD2 may drive both the first display area DA1 and the second display area DA2 by the normal frequency. During the multi-frequency mode MFM (refer to FIG. 3B), the electronic device DD2 may drive the first display area DA1, in which the first image IM1 is displayed, by the first driving frequency and may drive the second display area DA2, in which the second image IM2 is displayed, by the second driving frequency lower than the first driving frequency. In an embodiment, the first driving frequency may be higher than or equal to the normal frequency.

The size of each of the first display area DA1 and the second display area DA2 may be determined in advance and may be changed by an application program. In an embodiment, the first display area DA1 may correspond to the first non-folding area NFA1, and the second display area DA2 may correspond to the second non-folding area NFA2. In addition, a first portion of the folding area FA may correspond to the first display area DA1, and a second portion of the folding area FA may correspond to the second display area DA2.

In an embodiment, the entirety of the folding area FA may correspond to only one of the first display area DA1 and the second display area DA2.

In an embodiment, the first display area DA1 may correspond to a first portion of the first non-folding area NFA1, and the second display area DA2 may correspond to a second portion of the first non-folding area NFA1, the folding area FA, and the second non-folding area NFA2. That is, the size of the second display area DA2 may be larger than the size of the first display area DA1.

In an embodiment, the first display area DA1 may correspond to the first non-folding area NFA1, the folding area FA, and a first portion of the second non-folding area NFA2, and the second display area DA2 may correspond to a second portion of the second non-folding area NFA2. That is, the size of the first display area DA1 may be larger than the size of the second display area DA2.

As illustrated in FIG. 2B, in a state where the folding area FA is folded, the first display area DA1 may correspond to the first non-folding area NFA1, and the second display area DA2 may correspond to the folding area FA and the second non-folding area NFA2.

An embodiment of a display device in which the electronic device DD2 has one folding area is illustrated in FIGS. 2A and 2B, but the disclosure is not limited thereto. In an embodiment, the disclosure may be applied to an electronic device having two or more folding areas, a rollable electronic device, or a slidable electronic device, for example.

Below, the electronic device DD illustrated in FIG. 1 will be described as an illustrative embodiment but may be identically applied to the electronic device DD2 illustrated in FIGS. 2A and 2B.

Figure 3A:
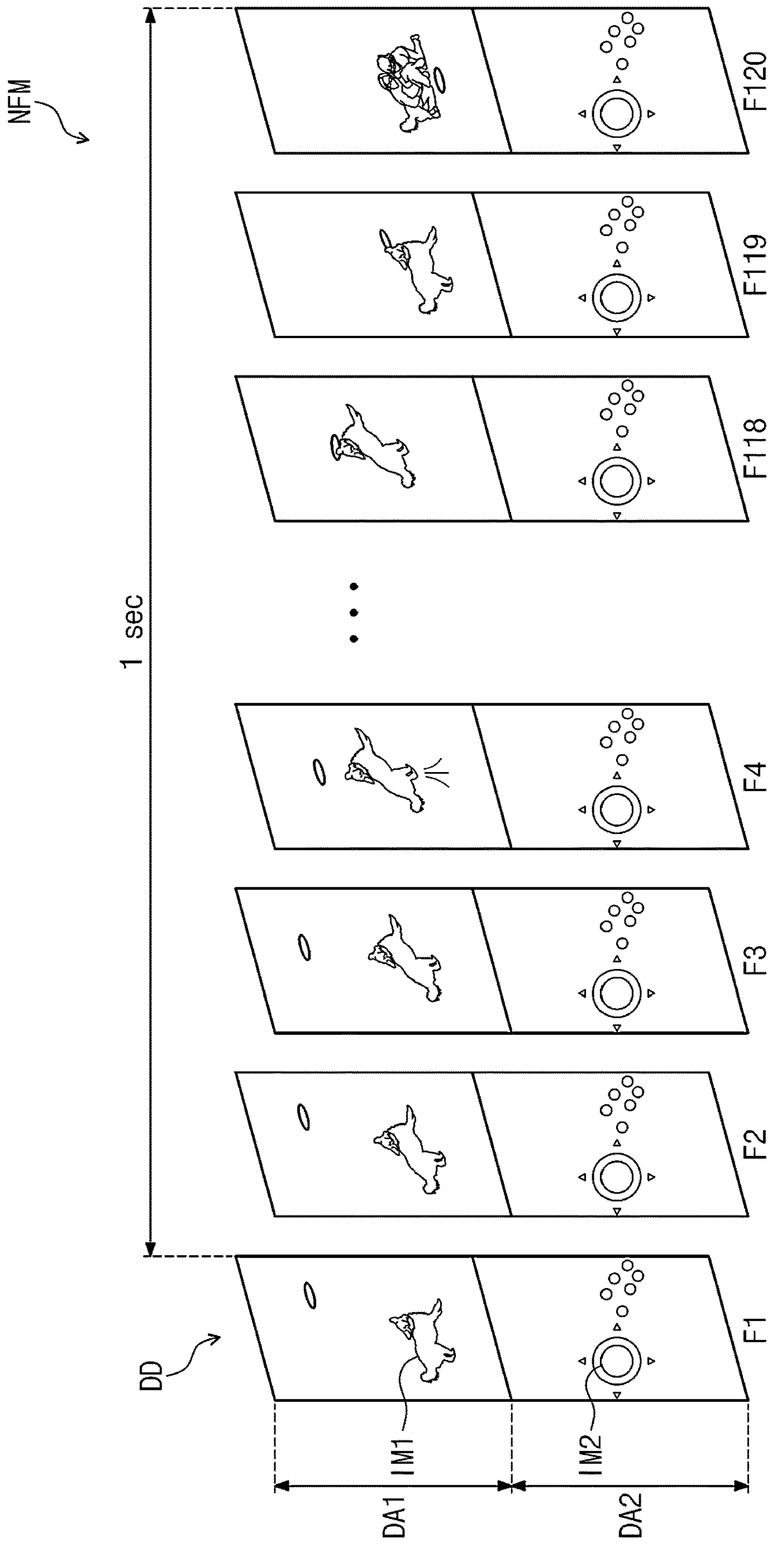
FIG. 3A is a diagram for describing an operation of an electronic device in a normal mode.
Figure 3B:
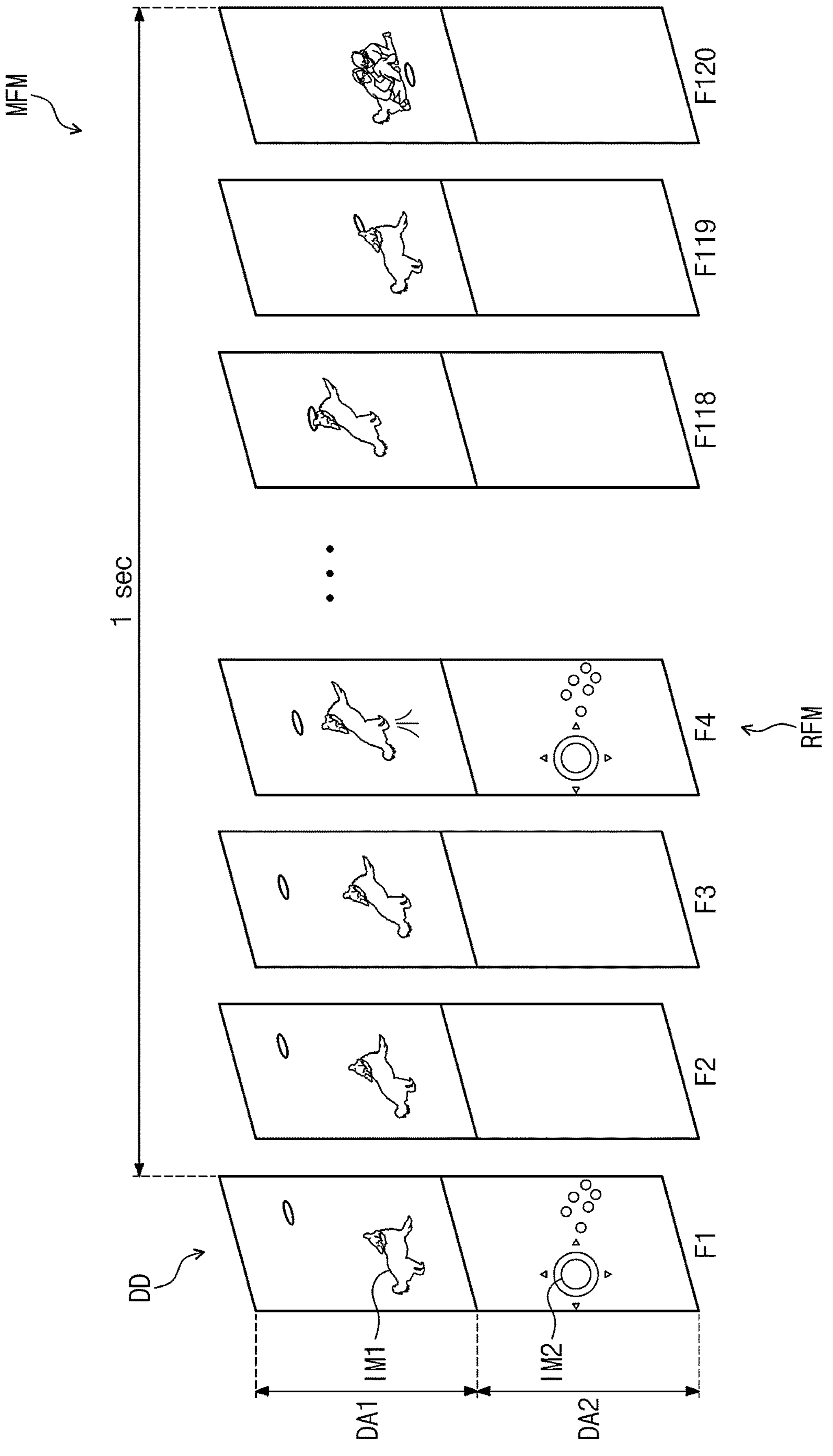
FIG. 3B is a diagram for describing an operation of an electronic device in a multi-frequency mode.

FIG. 3A is a diagram for describing an operation of an electronic device in a normal mode. FIG. 3B is a diagram for describing an operation of an electronic device in a multi-frequency mode.

Figure 4:
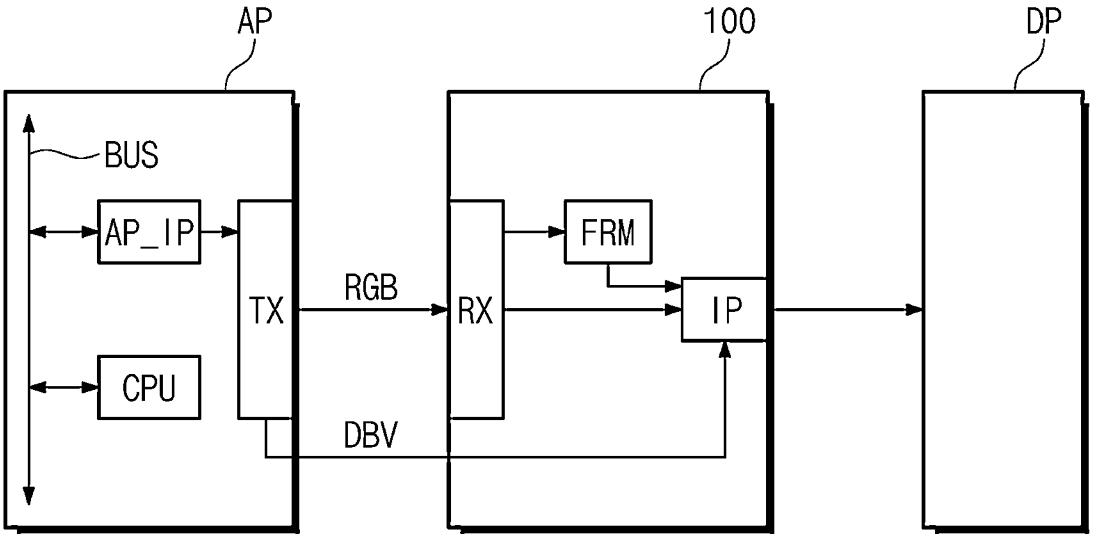
FIG. 4 is a block diagram of an embodiment of a host and a driving controller according to the disclosure.

Referring to FIG. 3A, the electronic device DD may include a display panel DP (refer to FIG. 4). The display panel DP (refer to FIG. 4) may include the first display area DA1 and the second display area DA2. The first image IM1 that is displayed in the first display area DA1 may be a video, and the second image IM2 that is displayed in the second display area DA2 may be a still image or an image (e.g., a game control keypad) having a long change period. The first image IM1 displayed in the first display area DA1 and the second image IM2 displayed in the second display area DA2 are illustrated in an embodiment of FIG. 1, and various images may be displayed in the electronic device DD.

In the normal mode NFM, the display area DA (refer to FIG. 1) may be controlled to operate at the normal frequency. In the normal mode NFM, the driving frequency of the first display area DA1 of the electronic device DD and the driving frequency of the second display area DA2 of the electronic device DD correspond to the normal frequency. In an embodiment, the normal frequency may be 120 hertz (Hz), for example. In the normal mode NFM, images of first frame F1 to the 120th frame F120 may be displayed in the first display area DA1 and the second display area DA2 of the electronic device DD for 1 second.

Referring to FIG. 3B, in the multi-frequency mode MFM, the electronic device DD may set a driving frequency of the first display area DA1, in which the first image IM1 (i.e., a video) is displayed, to the first driving frequency and may set a driving frequency of the second display area DA2, in which the second image IM2 (i.e., a still image) is displayed, to the second driving frequency lower than the first driving frequency. When the normal frequency is 120 Hz, the first driving frequency may be 120 Hz, and the second driving frequency may be 1 Hz. The first driving frequency and the second driving frequency may be variously changed. In an embodiment, the first driving frequency may be 120 Hz being the same frequency as the normal frequency, and the second driving frequency may be one of 30 Hz, 15 Hz, and 10 Hz lower than the normal frequency, for example.

In the multi-frequency mode MFM, when the first driving frequency is 120 Hz and the second driving frequency is 1 Hz, the first image IM1 corresponding to each of the first frame F1 to the 120th frame F120 may be displayed in the first display area DA1 of the electronic device DD for 1 second. The second image IM2 corresponding to only the first frame F1 may be displayed in the second display area DA2, and an image corresponding to each of the remaining frames F2, F3, and F118 to F120 may not be displayed in the second display area DA2.

That is, in the multi-frequency mode MFM, a portion of image information RGB (refer to FIG. 4) may be provided to the first display area DA1, and the remaining portion of the image information RGB (refer to FIG. 4) to be provided (or corresponding) to the second display area DA2 may be held. In this case, that the remaining portion of the image information RGB (refer to FIG. 4) is held may mean that the image information RGB (refer to FIG. 4) is not provided. The portion of the image information RGB (refer to FIG. 4) is information about an image to be displayed in the first display area DA1. How the electronic device DD operates in the multi-frequency mode MFM will be described in detail later.

When luminance information of the display areas DA1 and DA2 changes, the display panel DP (refer to FIG. 4) may operate in the refresh mode RFM.

In the refresh mode RFM, under control of the electronic device DD, the first display area DA1 and the second display area DA2 may operate at the normal frequency during one frame.

In an embodiment, when the luminance information changes in the multi-frequency mode MFM, the display panel DP may operate in the refresh mode RFM during one frame F4, for example. The display panel DP may again operate in the multi-frequency mode MFM from a frame following the frame F4 in which the display panel DP operates in the refresh mode RFM.

FIG. 4 is a block diagram of an embodiment of a host and a driving controller according to the disclosure.

Referring to FIGS. 3A to 4, the electronic device DD may refer to a device that is activated depending on an electrical signal. The electronic device DD may process image data and may display the processed image data through the display panel DP.

The electronic device DD may include a host AP, a driving controller 100, and the display panel DP.

The host AP may be implemented with an integrated circuit, a system-on-chip, an application processor, or a mobile application processor, but the disclosure is not limited thereto. The host AP may control various components included in the electronic device DD, e.g., the driving controller 100.

The host AP may generate luminance information DBV including a luminance value of the display area DA. The host AP may output the luminance information DBV to the driving controller 100.

The host AP and the driving controller 100 may be connected to each other through a given interface. In an embodiment, the given interface may include a mobile industry processor interface ("MIPI"), for example.

The host AP may include an image processor AP_IP, a transmitter TX, a central processing unit CPU, and a bus.

The image processor AP_IP may convert image data so as to be appropriate for the format that the transmitter TX is capable of processing. The image data with the converted format may be also referred to as "image information RGB".

The transmitter TX may output the luminance information DBV and the image information RGB. That is, the transmitter TX may transmit the luminance information DBV and the image information RGB to the driving controller 100. In an embodiment, the transmitter TX may transmit the image information RGB to a receiver RX, and the transmitter TX may transmit the luminance information DBV to an image processor IP, for example.

The luminance information DBV may include a luminance value. In an embodiment, the luminance information DBV may include one of a first luminance value to a tenth luminance value, for example. The first luminance value may be 2 nits. The second luminance value may be 4 nits. The tenth luminance value may be 500 nits. The display panel DP may control the luminance of the display area DA (refer to FIG. 5) based on the received luminance value.

The central processing unit CPU may allow the host AP to compress image data and to provide the compressed image data to the driving controller 100 through the transmitter TX.

The central processing unit CPU may control the components of the host AP through the bus.

The driving controller 100 may receive data, e.g., the image information RGB, from the host AP and may generate image data DATA (refer to FIG. 5) by converting the format of the image information RGB so as to be appropriate for the interface specification of the display panel DP.

The display panel DP may operate in the normal mode NFM, the multi-frequency mode MFM, or the refresh mode RFM.

The driving controller 100 may control the display panel DP. The driving controller 100 may be connected to the host AP through a given interface.

The given interface may include a mobile industry processor interface ("MIPI"). The MIPI may support two display standard modes, that is, a video mode and a command mode. The driving controller 100 may operate differently depending on a mode.

In the video mode, the driving controller 100 may operate by the receiver RX and the image processor IP.

The transmitter TX may transmit first frame data in the form of a packet. The first frame data may include a vertical active area and a vertical blank area. The vertical active area may include the image information RGB.

The receiver RX may receive the image information RGB from the transmitter TX and may transmit the received image information RGB to the image processor IP. The image processor IP may receive the image information RGB and may drive the display panel DP based on the image data DATA (refer to FIG. 5) obtained by converting the format of the image information RGB so as to be appropriate for the interface specification of the display panel DP.

That is, when the driving controller 100 intends to display a video in the display panel DP, the driving controller 100 may output the image data DATA (refer to FIG. 5) to the display panel DP depending on timing information in which the first frame data include.

The image processor IP may receive the luminance information DBV from the transmitter TX. When the luminance information DBV changes, the image processor IP may change the luminance value of the display panel DP.

When the luminance information DBV changes, the image processor IP may drive the display panel DP in the refresh mode RFM.

The image processor IP may receive the image information RGB from the transmitter TX through the receiver RX. This will be described later.

In the command mode, the driving controller 100 may operate by the receiver RX, a frame memory FRM, and the image processor IP. The frame memory FRM may be connected between the receiver RX and the image processor IP.

The transmitter TX may transmit second frame data. The second frame data may include only the image information RGB.

The receiver RX may receive the image information RGB from the transmitter TX and may transmit the received image information RGB to the frame memory FRM. The frame memory FRM may store the image information RGB. The frame memory FRM may provide at least a portion of the image information RGB to the image processor IP every frame.

The image processor IP may receive at least a portion of the image information RGB and may provide the display panel DP with the image data DATA (refer to FIG. 5) obtained by converting the format of the image information RGB so as to be appropriate for the interface specification of the display panel DP.

That is, when the driving controller 100 intends to display a still image in the display panel DP, the driving controller 100 may periodically read the image information RGB stored in the frame memory FRM and may output the read image information RGB to the display panel DP depending on the timing determined by the driving controller 100.

The image processor IP may receive the luminance information DBV from the transmitter TX. When the luminance information DBV changes, the image processor IP may change the luminance value of the display panel DP.

When the luminance information DBV changes, the image processor IP may drive the display panel DP in the refresh mode RFM.

The image processor IP may receive the image information RGB stored in the frame memory FRM. This will be described later.

Also, the host AP and the driving controller 100 may be connected to each other by a video panel self-refresh ("PSR") mode (hereinafter referred to as a "PSR mode").

In the PSR mode, the driving controller 100 may operate by the receiver RX, the frame memory FRM, and the image processor IP. The frame memory FRM may be connected between the receiver RX and the image processor IP.

In the case of intending to drive the display panel DP in the normal mode NFM, the receiver RX may receive the image information RGB from the transmitter TX and may transmit the received image information RGB to the image processor IP. The image processor IP may receive the image information RGB and may provide the display panel DP with the image data DATA (refer to FIG. 5) obtained by converting the format of the image information RGB so as to be appropriate for the interface specification of the display panel DP.

In the case of intending to the drive the display panel DP in the multi-frequency mode MFM, the receiver RX may receive the image information RGB from the transmitter TX and may transmit the received image information RGB to the frame memory FRM. The frame memory FRM may store the image information RGB. The frame memory FRM may provide at least a portion of the image information RGB to the image processor IP every frame.

The image processor IP may receive at least a portion of the image information RGB and may provide the display panel DP with the image data DATA (refer to FIG. 5) obtained by converting the format of the image information RGB so as to be appropriate for the interface specification of the display panel DP.

The image processor IP may receive the luminance information DBV. When the luminance information DBV changes, the image processor IP may change the luminance value of the display panel DP.

When the luminance information DBV changes, the image processor IP may drive the display panel DP by the refresh mode RFM in the multi-frequency mode MFM.

The image processor IP may receive the image information RGB stored in the frame memory FRM.

Figure 5:
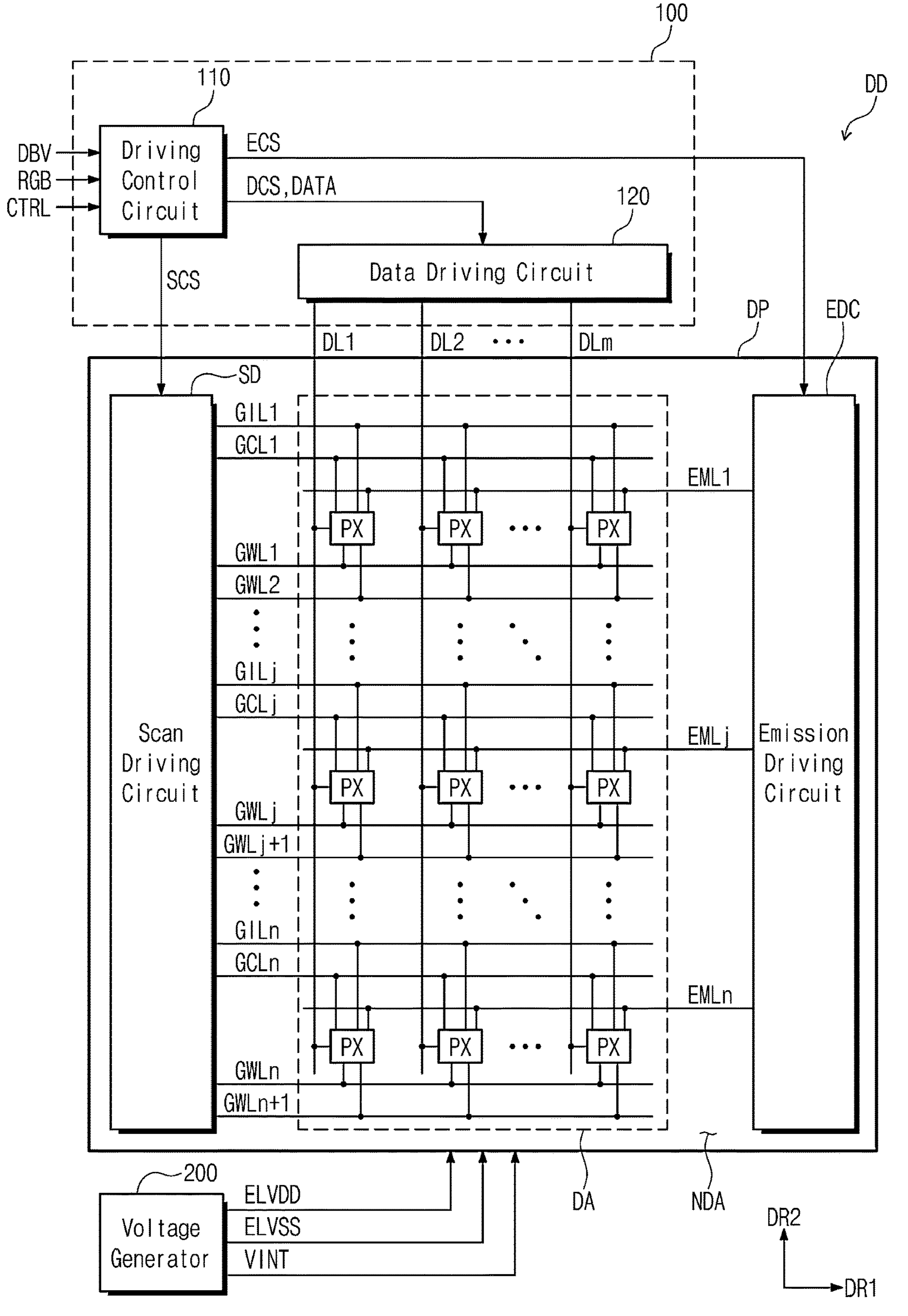
FIG. 5 is a block diagram of an embodiment of an electronic device according to the disclosure.

FIG. 5 is a block diagram of an embodiment of an electronic device according to the disclosure.

Referring to FIG. 5, the electronic device DD includes the display panel DP, the driving controller 100, and a voltage generator 200.

The driving controller 100 may include a driving control circuit 110 and a data driving circuit 120.

The driving control circuit 110 receives the image information RGB, a control signal CTRL, and the luminance information DBV. The driving control circuit 110 generates the image data DATA by converting a data format of the image information RGB in compliance with the specification for an interface with the data driving circuit 120. The driving control circuit 110 outputs a scan control signal SCS, a data control signal DCS, and an emission control signal ECS.

The data driving circuit 120 receives the data control signal DCS and the image data DATA from the driving control circuit 110. The data driving circuit 120 converts the image data DATA into data signals and then outputs the data signals to a plurality of data lines DL1 to DLm to be described later. Here, m is a natural number. The data signals refer to analog voltages corresponding to grayscale values of the image data DATA.

The voltage generator 200 generates voltages desired for the operation of the display panel DP. In an embodiment, the voltage generator 200 generates a first driving voltage ELVDD, a second driving voltage ELVSS, and an initialization voltage VINT. The initialization voltage VINT may include a first initialization voltage VINT1 (refer to FIG. 6) and a second initialization voltage VINT2 (refer to FIG. 6).

The display panel DP includes scan lines GIL1 to GILn, GCL1 to GCLn, and GWL1 to GWLn+1, emission control lines EML1 to EMLn, the data lines DL1 to DLm, and pixels PX. Here, n is a natural number. The display panel DP may further include a scan driving circuit SD and an emission driving circuit EDC. In an embodiment, the scan driving circuit SD is disposed on a first side of the display panel DP. The scan lines GIL1 to GILn, GCL1 to GCLn, and GWL1 to GWLn+1 extend from the scan driving circuit SD in the first direction DR1.

The emission driving circuit EDC is disposed on a second side of the display panel DP. The emission control lines EML1 to EMLn extend from the emission driving circuit EDC in a direction facing away from the first direction DR1.

The scan lines GIL1 to GILn, GCL1 to GCLn, and GWL1 to GWLn+1 and the emission control lines EML1 to EMLn are spaced from each other in the second direction DR2. The data lines DL1 to DLm extend from the data driving circuit 120 in a direction facing away from the second direction DR2 and are spaced from each other in the first direction DR1.

In the example illustrated in FIG. 5, the scan driving circuit SD and the emission driving circuit EDC are disposed to face each other with the pixels PX interposed therebetween, but the disclosure is not limited thereto. In an embodiment, the scan driving circuit SD and the emission driving circuit EDC may be disposed adjacent to each other on one of the first side and the second side of the display panel DP, for example. In an embodiment, the scan driving circuit SD and the emission driving circuit EDC may be implemented with one circuit.

The plurality of pixels PX is electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. In an embodiment, as illustrated in FIG. 5, the pixels PX belonging to the first row may be connected to the scan lines GIL1, GCL1, GWL1, and GWL2 and the emission control line EML1, for example. Also, the pixels PX belonging to the j-th row may be connected to the scan lines GILj, GCLj, GWLj, and GWLj+1 and the emission control line EMLj.

Each of the plurality of pixels PX includes a light-emitting element (e.g., light-emitting diode) ED (refer to FIG. 6) and a pixel circuit PXC (refer to FIG. 6) for controlling the emission of the light-emitting element ED. The pixel circuit PXC may include one or more transistors and one or more capacitors. The scan driving circuit SD and the emission driving circuit EDC may include transistors formed through the same process as the pixel circuit PXC.

Each of the plurality of pixels PX receives the first driving voltage ELVDD, the second driving voltage ELVSS, the first initialization voltage VINT1 (refer to FIG. 6), and the second initialization voltage VINT2 (refer to FIG. 6) from the voltage generator 200.

The scan driving circuit SD receives the scan control signal SCS from the driving controller 100. The scan driving circuit SD may output scan signals to the scan lines GIL1 to GILn, GCL1 to GCLn, and GWL1 to GWLn+1 in response to the scan control signal SCS. A circuit configuration and an operation of the scan driving circuit SD will be described in detail later.

The driving controller 100 in an embodiment may divide the display panel DP into the first display area DA1 (refer to FIG. 1) and the second display area DA2 (refer to FIG. 1) based on the image information RGB and may set the driving frequency of each of the first display area DA1 and the second display area DA2. In an embodiment, in the normal node, the driving controller 100 drives the first display area DA1 and the second display area DA2 by the normal frequency (e.g., 120 Hz), for example. In the multi-frequency mode, the driving controller 100 may drive the first display area DA1 by the first operating frequency (e.g., 120 Hz) and may drive the second display area DA2 by the second operating frequency (e.g., 10 Hz).

Figure 6:
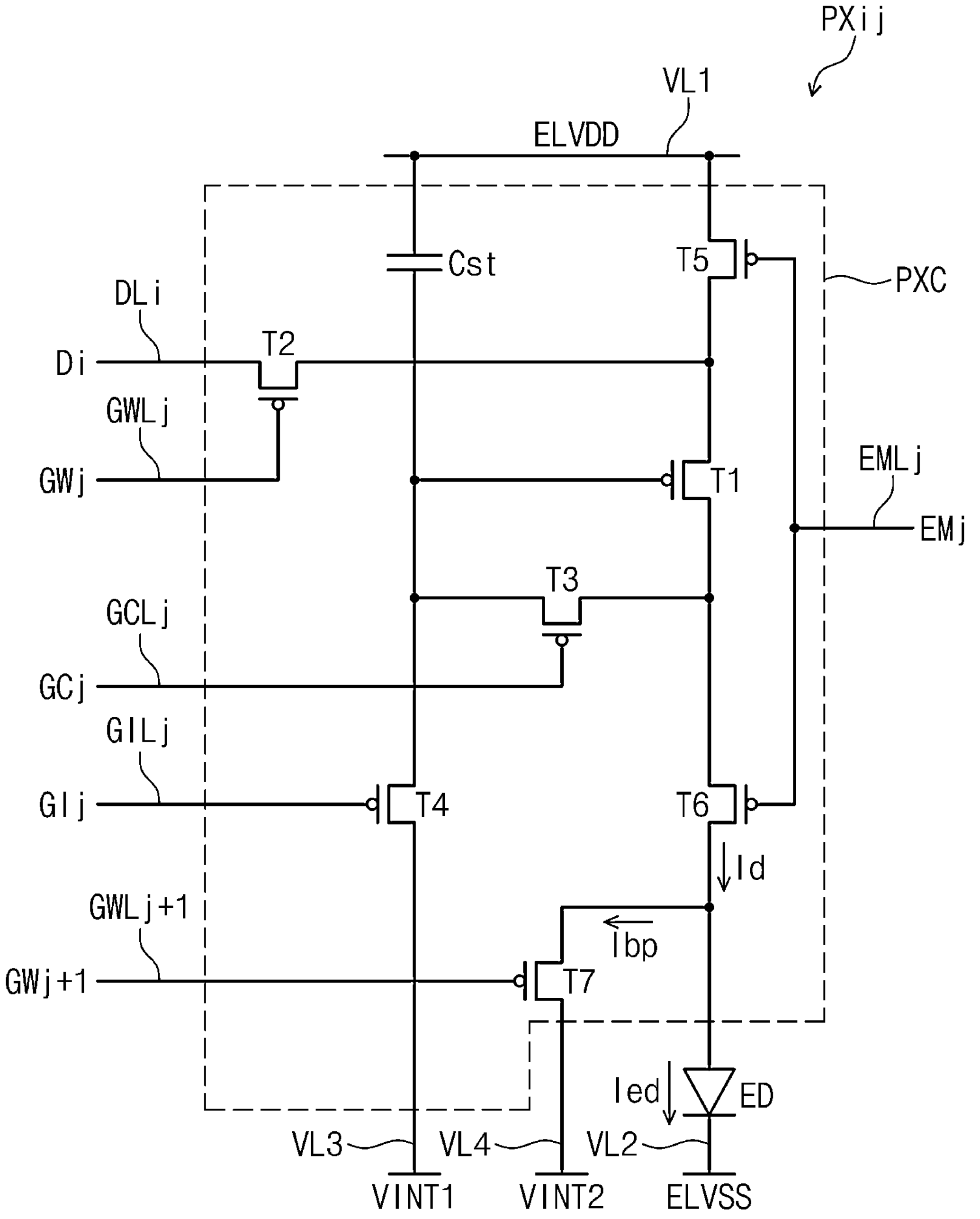
FIG. 6 is an equivalent circuit diagram of an embodiment of a pixel according to the disclosure.

FIG. 6 is an equivalent circuit diagram of an embodiment of a pixel according to the disclosure.

An equivalent circuit diagram of a pixel PXij that is connected to the i-th data line DLi among the data lines DL1 to DLm, the j-th scan lines GILj, GCLj, and GWLj and the (j+1)-th scan line GWLj+1 among the scan lines GIL1 to GILn, GCL1 to GCLn, and GWL1 to GWLn+1, and the j-th emission control line EMLj among the emission control lines EML1 to EMLn is illustrated in FIG. 6. Here, i and j may be natural numbers equal to or less than m and n, respectively.

Each of the pixels PX illustrated in FIG. 5 may have the same circuit configuration as the equivalent circuit diagram of the pixel PXij illustrated in FIG. 6. In an embodiment, in the pixel circuit PXC of the pixel PXij, each of third and fourth transistors T3 and T4 among first to seventh transistors T1 to T7 is an N-type transistor that uses an oxide semiconductor as a semiconductor layer, and each of the first, second, fifth, sixth, and seventh transistors T1, T2, T5, T6, and T7 is a P-type transistor having a low-temperature polycrystalline silicon ("LTPS") semiconductor layer. However, the disclosure is not limited thereto. In an embodiment, all the first to seventh transistors T1 to T7 may be P-type transistors or N-type transistors. In an embodiment, at least one of the first to seventh transistors T1 to T7 may be an N-type transistor, and the remaining transistors may be P-type transistors, for example. Also, a circuit configuration of a pixel in an embodiment of the disclosure is not limited to FIG. 6. The pixel circuit PXC illustrated in FIG. 6 is only an example, and the configuration of the pixel circuit PXC may be modified and implemented.

Referring to FIG. 6, the pixel PXij of the electronic device DD/DD2 in an embodiment may include the first to seventh transistors T1, T2, T3, T4, T5, T6, and T7, a capacitor Cst, and at least one light-emitting element ED. In an embodiment, an embodiment in which one pixel PXij includes one light-emitting element ED will be described.

The scan lines GILj, GCLj, GWLj, and GWLj+1 may respectively transfer scan signals GIj, GCj, GWj, and GWj+1, and the emission control line EMLj may transfer an emission signal EMj. The data line DLi transfers a data signal Di. The data signal Di may have a voltage level corresponding to the image information RGB input to the electronic device DD (refer to FIG. 5). First to fourth driving voltage lines VL1, VL2, VL3, and VLA may respectively transfer the first driving voltage ELVDD, the second driving voltage ELVSS, the first initialization voltage VINT1, and the second initialization voltage VINT2.

The first transistor T1 includes a first electrode connected to the first driving voltage line VL1 through the fifth transistor T5, a second electrode electrically connected to an anode of the light-emitting element ED through the sixth transistor T6, and a gate electrode connected to a first end of the capacitor Cst. The first transistor T1 may receive the data signal Di transferred through the data line DLi depending on a switching operation of the second transistor T2 and may supply a driving current Id to the light-emitting element ED.

The second transistor T2 includes a first electrode connected to the data line DLi, a second electrode connected to the first electrode of the first transistor T1, and a gate electrode connected to the scan line GWLj. The second transistor T2 may be turned on depending on the scan signal GWj transferred through the scan line GWLj and may transfer the data signal Di from the data line DLi to the first electrode of the first transistor T1.

The third transistor T3 includes a first electrode connected to the gate electrode of the first transistor T1, a second electrode connected to the second electrode of the first transistor T1, and a gate electrode connected to the scan line GCLj. The third transistor T3 may be turned on depending on the scan signal GCj transferred through the scan line GCLj, and thus, the gate electrode and the second electrode of the first transistor T1 may be connected, that is, the first transistor T1 may be diode-connected.

The fourth transistor T4 includes a first electrode connected to the gate electrode of the first transistor T1, a second electrode connected to the third driving voltage line VL3 through which the first initialization voltage VINT1 is transferred, and a gate electrode connected to the scan line GILj. The fourth transistor T4 may be turned on depending on the scan signal GIj transferred through the scan line GILj, and thus, the first initialization voltage VINT1 may be transferred to the gate electrode of the first transistor T1. As such, a voltage of the gate electrode of the first transistor T1 may be initialized. This operation may be also referred to as an "initialization operation".

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light-emitting element ED, and a gate electrode connected to the emission control line EMLj.

The fifth transistor T5 and the sixth transistor T6 may be simultaneously turned on depending on the emission signal EMj transferred through the emission control line EMLj. As such, the first driving voltage ELVDD may be compensated for through the diode-connected transistor T1 so as to be supplied to the light-emitting element ED.

The seventh transistor T7 includes a first electrode connected to the second electrode of the sixth transistor T6, a second electrode connected to the fourth driving voltage line VL4, and a gate electrode connected to the scan line GWLj+1. The seventh transistor T7 is turned on depending on the scan signal GWj+1 received through the scan line GWLj+1 and bypasses a current of the anode of the light-emitting element ED to the fourth driving voltage line VLA.

The first end of the capacitor Cst is connected to the gate electrode of the first transistor T1 as described above, and a second end of the capacitor Cst is connected to the first driving voltage line VL1. The cathode of the light-emitting element ED may be connected to the second driving voltage line VL2 transferring the second driving voltage ELVSS. The structure of the pixel PXij in an embodiment is not limited to the structure illustrated in FIG. 6. In an embodiment, the number of transistors included in one pixel PXij, the number of capacitors included in the pixel PXij, and the connection relationship between the transistors and the capacitors may be variously modified, for example.

Figure 7:
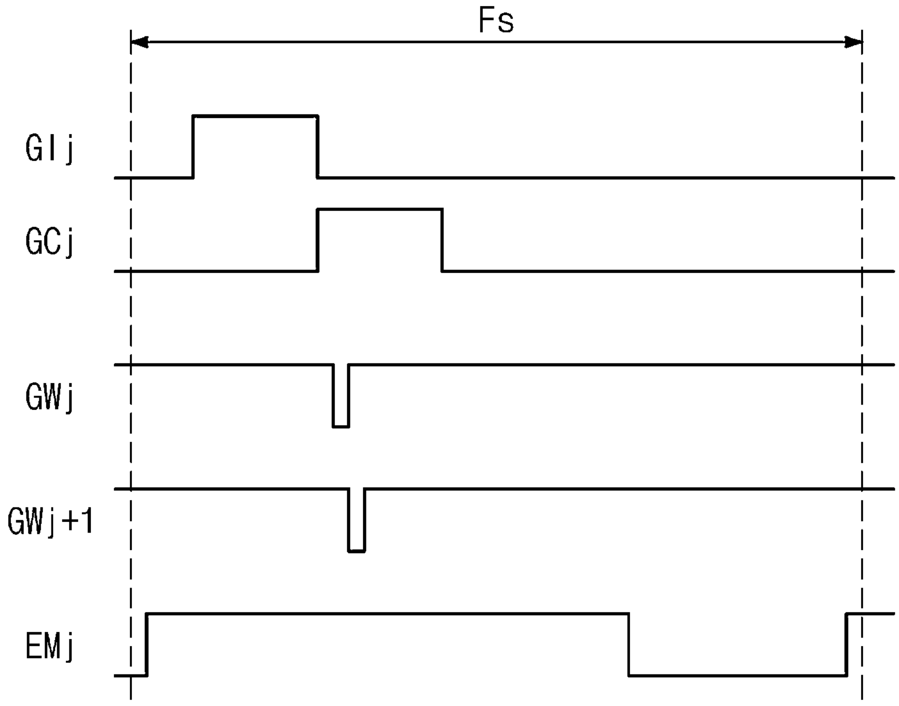
FIG. 7 is a timing diagram for describing an operation of a pixel illustrated in FIG. 6.

FIG. 7 is a timing diagram for describing an operation of a pixel illustrated in FIG. 6. An operation of an electronic device in an embodiment will be described with reference to FIGS. 6 and 7.

Referring to FIGS. 6 and 7, the scan signal GIj of the relatively high level is provided through the scan line GILj during the initialization period within one frame Fs. When the fourth transistor T4 is turned on in response to the scan signal GIj of the relatively high level, the first initialization voltage VINT1 is supplied to the gate electrode of the first transistor T1 through the fourth transistor T4 such that the first transistor T1 is initialized.

Next, when the scan signal GCj of the relatively high level is supplied through the scan line GCLj during a data programming and compensation period, the third transistor T3 is turned on. In this case, the first transistor T1 is diode-connected by the third transistor T3 thus turned on and is forward-biased. Also, the second transistor T2 is turned on by the scan signal GWj of the relatively low level. In this case, a compensation voltage "Di-Vth" obtained by subtracting the threshold voltage Vth of the first transistor T1 from the voltage of the i-th data signal Di supplied from the data line DLi is applied to the gate electrode of the first transistor T1. That is, a gate voltage applied to the gate electrode of the first transistor T1 may be the compensation voltage "Di-Vth".

The first driving voltage ELVDD and the compensation voltage "Di-Vth" may be respectively applied to opposite ends of the capacitor Cst, and charges corresponding to a voltage difference of the opposite ends of the capacitor Cst may be stored in the capacitor Cst.

The seventh transistor T7 is turned on in response to the scan signal GWj+1 of the relatively low level transferred through the scan line GWLj+1. A portion of the driving current Id may be drained through the seventh transistor T7 as a bypass current Ibp.

When the light-emitting element ED emits a light under the condition that a minimum current of the first transistor T1 flows as a driving current for the purpose of displaying a black image, the black image may not be normally displayed. Accordingly, the seventh transistor T7 in the pixel PXij in an embodiment of the disclosure may drain (or disperse) a portion of the minimum current of the first transistor T1 to a current path, which is different from a current path to the light-emitting element ED, as the bypass current Ibp. Herein, the minimum current of the first transistor T1 means a current flowing under the condition that a gate-source voltage of the first transistor T1 is smaller than the threshold voltage Vth, that is, under the condition that the first transistor T1 is turned off. As a minimum driving current (e.g., a current of 10 picoampere (pA) or less) is supplied to the light-emitting element ED, with the first transistor T1 turned off, an image of black luminance is expressed. When the minimum driving current for displaying a black image flows, the influence of the bypass transfer of the bypass current Ibp may be relatively great; In contrast, when a relatively large driving current for displaying an image such as a normal image or a white image flows, there may be substantially no influence of the bypass current Ibp. Accordingly, when a driving current for displaying a black image flows, an emission current Ied of the light-emitting element ED, which corresponds to a result of subtracting the bypass current Ibp drained through the seventh transistor T7 from the driving current Id, may have a minimum current amount to such an extent as to accurately express a black image. Accordingly, a contrast ratio may be improved by accurately implementing an image of black luminance by the seventh transistor T7. In an embodiment, a bypass signal is the scan signal GWj+1 of the relatively low level but is not necessarily limited thereto.

Next, during an emission period, the emission control signal EMj supplied from the emission control line EMLj transitions from the relatively high level to the relatively low level. During the emission period, the fifth transistor T5 and the sixth transistor T6 are turned on by the emission control signal EMj of the relatively low level. In this case, the driving current Id is generated depending on a difference between the gate voltage of the gate electrode of the first transistor T1 and the first driving voltage ELVDD and is supplied to the light-emitting element ED through the sixth transistor T6. That is, the emission current led flows through the light-emitting element ED.

Figure 8:
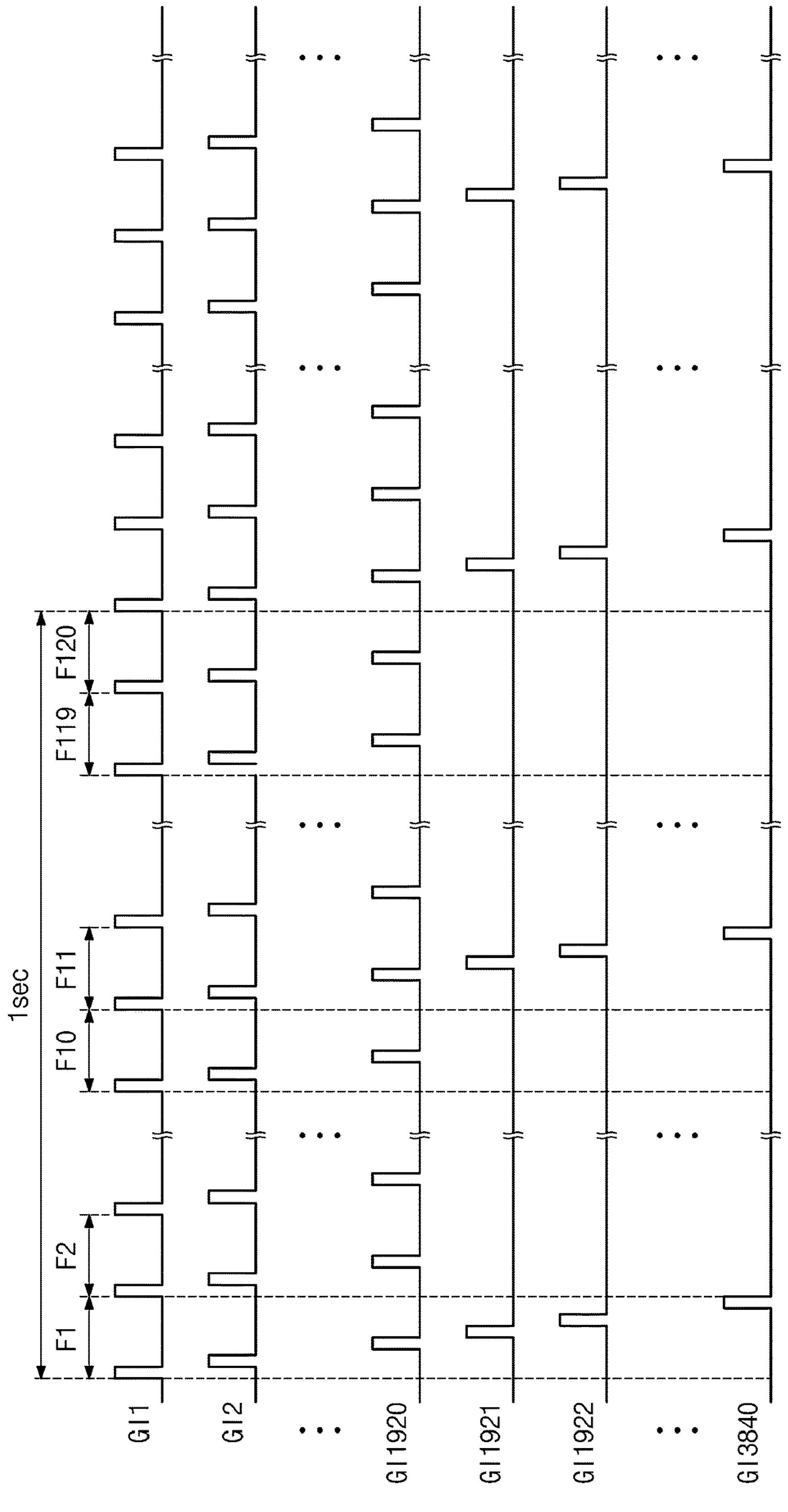
FIG. 8 illustrates scan signals in a multi-frequency mode.

FIG. 8 illustrates scan signals GI1 to GI3840 in a multi-frequency mode.

Referring to FIG. 8, in the multi-frequency mode MFM (refer to FIG. 3), the frequency of each of the scan signals GI1 to GI1920 is 120 Hz, and the frequency of each of the scan signals GI1921 to GI3840 is 10 Hz.

In an embodiment, the scan signals GI1 to GI1920 correspond to scan signals that are provided to the first display area DA1 of the electronic device DD (refer to FIG. 1), and the scan signals GI1921 to GI3840 correspond to scan signals that are provided to the second display area DA2 thereof, for example.

The scan signals GI1 to GI1920 may transition to the relatively high level (or an active level) in each of the first frame F1 to the 120th frame F120, and the scan signals GI1921 to GI3840 may transition to the relatively high level every ten frames, e.g., in the first frame F1 and the 11th frame F11.

Accordingly, the first display area DA1 in which a video is displayed may be driven in response to the scan signals GI1 to GI1920 having the normal frequency (e.g., 120 Hz), and the second display area DA2 in which a still image is displayed may be driven in response to the scan signals GI1921 to GI3840 having a relatively low frequency (e.g., 10 Hz). Because only the second display area DA2 in which the still image is displayed is driven by the relatively low frequency, power consumption may be reduced without the decrease in the display quality of the electronic device DD (refer to FIG. 1).

Only the scan signals GI1 to GI3840 are illustrated in FIG. 8 in an embodiment, but as in the scan signals GI1 to GI3840, the scan driving circuit SD (refer to FIG. 5) may generate the scan signals GCj (refer to FIG. 7), the number of which is equal to the number of scan signals GI1 to GI3840, and the scan signals GWj (refer to FIG. 7), the number of which is equal to the number of scan signals GI1 to GI3840, and the emission driving circuit EDC (refer to FIG. 5) may generate the emission signals EMj (refer to FIG. 7), the number of which is equal to the number of scan signals GI1 to GI3840.

FIG. 9 is a diagram illustrating a luminance change of the first display area DA1 and the second display area DA2 in a multi-frequency mode, a normal mode, and a refresh mode.

Referring to FIGS. 3A, 3B, 4, and 9, first to seventh frame periods FR1 to FR7 may be sequentially provided to display the images IM1 and IM2 in the display panel DP.

In the first frame period FR1, the display panel DP may operate in the normal mode NFM. In the normal mode NFM, the driving frequencies of the first display area DA1 and the second display area DA2 of the display panel DP may be identical. In this case, the driving frequencies may correspond to the normal frequency. The normal frequency may be 120 Hz, but the disclosure is not limited thereto.

In the normal mode NFM, image data based on the image information RGB corresponding to the first display area DA1 may be provided to the first display area DA1, and image data based on the image information RGB corresponding to the second display area DA2 may be provided to the second display area DA2. In an embodiment, the first image IM1 may be displayed in the first display area DA1, and the second image IM2 may be displayed in the second display area DA2, for example.

In the first frame period FR1, the luminance information DBV of the display area DA may include a tenth luminance value DBV10. The luminance of the display panel DP, which corresponds to the tenth luminance value DBV10, may be 500 nits.

In the second to fourth frame periods FR2 to FR4, the display panel DP may operate in the multi-frequency mode MFM.

In the second frame period FR2 corresponding to the first frame of the multi-frequency mode MFM, the driving frequency of the first display area DA1 may be the first driving frequency. The first driving frequency may be the same as the normal frequency and may be 120 Hz, for example. The driving frequency of the second display area DA2 may be the second driving frequency. The second driving frequency may be lower than the first driving frequency. In an embodiment, the second driving frequency may be 10 Hz. In this case, image data based on the image information RGB corresponding to the first display area DA1 may be provided to the first display area DA1, and image data based on the image information RGB corresponding to the second display area DA2 may be provided to the second display area DA2, for example.

In the second frame period FR2, the luminance information DBV of the display area DA may include the tenth luminance value DBV10.

In the third frame period FR3, image data based in the image information RGB corresponding to the first display area DA1 may be provided to the first display area DA1. In the third frame period FR3, image data may not be provided to the second display area DA2. In an embodiment, that the image data are not provided may mean that the image data are held.

According to the disclosure, because image data to be provided to the display panel DP operating in the multi-frequency mode MFM are held during a give frame period, the driving controller 100 may operate in a low-power driving state or a power-off state. Accordingly, the electronic device DD (refer to FIG. 1) in which power consumption is reduced may be provided.

In the third frame period FR3, the luminance information DBV of the display area DA may include the tenth luminance value DBV10.

In the fourth frame period FR4, image data based in the image information RGB corresponding to the first display area DA1 may be provided to the first display area DA1. In the fourth frame period FR4, image data may not be provided to the second display area DA2.

In the fourth frame period FR4, the luminance information DBV of the display area DA may include the tenth luminance value DBV10.

In the fifth frame period FR5, the luminance information DBV of the display area DA may change from the tenth luminance value DBV10 to a first luminance value DBV1. The host AP may generate the luminance information DBV including the first luminance value DBV1. The host AP may provide the luminance information DBV to the driving controller 100. The luminance of the display panel DP, which corresponds to the first luminance value DBV1, may be 2 nits. That is, that the luminance value of the display panel DP changes from the tenth luminance value DBV10 to the first luminance value DBV1 may mean that the luminance of the display panel DP decreases.

In this case, in the fifth frame period FR5, the display panel DP may operate in the refresh mode RFM. The refresh mode RFM may be used to allow the display area DA to operate at the normal frequency during one frame FR5. In the refresh mode RFM, image data based on the image information RGB corresponding to the first display area DA1 may be provided to the first display area DA1, and image data based on the image information RGB corresponding to the second display area DA2 may be provided to the second display area DA2.

While the host AP and the driving controller 100 operate in the video mode, when the luminance information DBV changes, the image processor IP may drive the display panel DP in the refresh mode RFM. The image processor IP may receive the image information RGB from the transmitter TX through the receiver RX.

While the host AP and the driving controller 100 operate in the command mode, when the luminance information DBV changes, the image processor IP may drive the display panel DP in the refresh mode RFM. The image processor IP may receive the image information RGB stored in the frame memory FRM.

While the host AP and the driving controller 100 operate in the PSR mode, when the luminance information DBV changes, the image processor IP may drive the display panel DP by the refresh mode RFM in the multi-frequency mode MFM. The image processor IP may receive the image information RGB stored in the frame memory FRM.

In the sixth and seventh frame periods FR6 and FR7 that start after there is completed the fifth frame period FR5 in which the display panel DP operates in the refresh mode RFM, the display panel DP may again operate in the multi-frequency mode MFM.

In the sixth frame period FR6, image data based in the image information RGB corresponding to the first display area DA1 may be provided to the first display area DA1. In the sixth frame period FR6, image data may not be provided to the second display area DA2.

In the sixth frame period FR6, the luminance information DBV of the display area DA may be updated by the refresh mode RFM so as to change from the tenth luminance value DBV10 to the first luminance value DBV1. The luminance information DBV of the display area DA may include the first luminance value DBV1.

In the seventh frame period FR7, image data based in the image information RGB corresponding to the first display area DA1 may be provided to the first display area DA1. In the seventh frame period FR7, image data may not be provided to the second display area DA2.

According to the disclosure, because image data to be provided to the display panel DP operating in the multi-frequency mode MFM are held during a give frame period, the driving controller 100 may operate in a low-power driving state or a power-off state. Accordingly, the electronic device DD (refer to FIG. 1) in which power consumption is reduced may be provided.

In the seventh frame period FR7, the luminance information DBV of the display area DA may include the first luminance value DBV1.

Unlike the embodiment of the disclosure above, when a luminance change is made while the display panel DP operates in the multi-frequency mode MFM, image data may not be provided in a period where the display panel DP operates at a relatively low frequency, that is, luminance information may not be updated. In this case, a luminance difference may be between a first display area operating at a relatively high frequency and a second display area operating at a relatively low frequency and may be visually perceived by the user. However, when the luminance of the display panel DP changes while the display panel DP is driven in the multi-frequency mode MFM, the display panel DP may operate in the refresh mode RFM during one frame. The image information RGB and the luminance information DBV may be provided to the second display area DA2 operating at a relatively low frequency during the refresh mode RFM. This may mean that a luminance value of the display panel DP is updated depending on the luminance information DBV during the refresh mode RFM. Each of the first display area DA1 and the second display area DA2 may emit a light of the same luminance. That is, the luminance of the display area DA may be uniform. It may be possible to prevent a luminance difference and an image quality difference within one frame. Accordingly, the electronic device DD whose display quality is improved may be implemented.

According to the above description, when luminance information changes in a multi-frequency mode, an electronic device may drive a display panel in a refresh mode, and thus, a luminance difference of display areas of the display panel may be prevented. Accordingly, an electronic device whose display quality is improved may be provided.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. An electronic device comprising:

a display panel which operates in a normal mode, a multi-frequency mode, or a refresh mode, and in which a display area is defined;

a driving controller which controls the display panel; and a host which generates a luminance information including a luminance value of the display area and outputs the luminance information to the driving controller, wherein, in the multi-frequency mode, the display area is divided into a first display area and a second display area immediately next to the first display area, and the first display area and the second display area operate at different frequencies by the driving controller, wherein, in the normal mode, the display area operates at a normal frequency by the driving controller, wherein, in the refresh mode, the display area operates at the normal frequency during one frame by the driving controller, and wherein, when the luminance information changes, the display panel operates in the refresh mode.

2. The electronic device of claim 1, wherein, during the multi-frequency mode, the first display area operates at a first driving frequency, and the second display area operates at a second driving frequency lower from the first driving frequency.

3. The electronic device of claim 2, wherein the first driving frequency is identical to the normal frequency, and the second driving frequency is lower than the normal frequency.

4. The electronic device of claim 1, wherein the host includes:

a transmitter which outputs the luminance information and an image information, and wherein the driving controller includes:

a receiver which receives the image information; and an image processor which receives the luminance information.

5. The electronic device of claim 4, wherein, when the luminance information changes, the image processor changes the luminance value of the display panel.

6. The electronic device of claim 4, wherein, in the normal mode and the refresh mode, the image information corresponding to the display area is provided, and wherein, in the multi-frequency mode, a portion of the image information is provided to the first display area, and a remaining portion of the image information to be provided to the second display area is held.

7. The electronic device of claim 6, wherein, when the luminance information changes, the image processor drives the display panel in the refresh mode, and wherein the image processor receives the image information from the transmitter through the receiver.

8. The electronic device of claim 6, wherein the driving controller further includes:

a frame memory connected between the receiver and the image processor, wherein the frame memory stores the image information and provides the image processor with at least a portion of the image information every frame.

9. The electronic device of claim 8, wherein, when the luminance information changes, the image processor drives the display panel in the refresh mode, and wherein the image processor receives the image information stored in the frame memory.

10. The electronic device of claim 8, wherein the transmitter provides the image information to the receiver, wherein, during the normal mode, the receiver provides the image information to the image processor, and the image processor drives the display panel based on the image information, and wherein, during the multi-frequency mode, the receiver transmits the image information to the frame memory, the frame memory stores the image information, and the image processor drives the display panel based on the image information stored in the frame memory.

11. The electronic device of claim 10, wherein, when the luminance information changes, the image processor drives the display panel by the refresh mode in the multi-frequency mode, and wherein the image processor receives the image information stored in the frame memory.

12. The electronic device of claim 1, wherein the display panel operates in units of frame, wherein the frame includes a first frame period, a second frame period, and a third frame period sequentially provided, wherein the luminance information changes from a first luminance value to a second luminance value different from the first luminance value, wherein, in the first frame period, the display panel operates in the multi-frequency mode, and the display area displays an image by the first luminance value, wherein, when the luminance information changes in the second frame period, the display panel operates in the refresh mode, and the display area displays the image by the second luminance value, and wherein, in the third frame period, the display panel operates in the multi-frequency mode, and the display area displays the image by the second luminance value.

13. An electronic device comprising:

a display panel which operates in a normal mode, a multi-frequency mode, or a refresh mode, and in which display area is defined;

a driving controller which controls the display panel; and a host which generates a luminance information including a luminance value of the display area and outputs the luminance information to the driving controller, wherein, in the multi-frequency mode, the display area is divided into a first display area and a second display area immediately next to the first display area, and the first display area and the second display area operate at different frequencies by the driving controller, wherein, in the normal mode, the display area operates at a normal frequency by the driving controller, wherein, in the refresh mode, the display area operates at the normal frequency during one frame by the driving controller, wherein the luminance information includes a first luminance information having a first luminance value and a second luminance information having a second luminance value different from the first luminance value, and wherein the display panel operating in the multi-frequency mode operates in the refresh mode when the luminance information changes from the first luminance value to the second luminance value.

14. The electronic device of claim 13, wherein the host includes:

a transmitter which outputs the luminance information and an image information, and wherein the driving controller includes:

a receiver which receives the image information; and an image processor which receives the luminance information.

15. The electronic device of claim 14, wherein, when the luminance information changes, the image processor changes the luminance value of the display panel.

16. The electronic device of claim 14, wherein, in the normal mode and the refresh mode, the image information corresponding to the display area is provided, and wherein, in the multi-frequency mode, a portion of the image information is provided to the first display area, and a remaining portion of the image information to be provided to the second display area is held.

17. The electronic device of claim 16, wherein, when the luminance information changes, the image processor drives the display panel in the refresh mode, and wherein the image processor receives the image information from the transmitter through the receiver.

18. The electronic device of claim 16, wherein the driving controller further includes:

a frame memory connected between the receiver and the image processor, wherein the frame memory stores the image information and provides the image processor with at least a portion of the image information every frame.

19. The electronic device of claim 18, wherein, when the luminance information changes, the image processor drives the display panel in the refresh mode, and wherein the image processor receives the image information stored in the frame memory.

20. The electronic device of claim 13, wherein, during the multi-frequency mode, the first display area operates at a first driving frequency, and the second display area operates at a second driving frequency lower from the first driving frequency, and wherein the first driving frequency is identical to the normal frequency, and the second driving frequency is lower than the normal frequency.

21. An electronic device comprising:

a display panel which operates in a normal mode, a multi-frequency mode, or a refresh mode, and in which a display area is defined; and a driving controller which controls the display panel and receives a luminance information including a luminance value of the display area, wherein, in the multi-frequency mode, the display area is divided into a first display area and a second display area immediately next to the first display area, and the first display area and the second display area operate at different frequencies by the driving controller, wherein, in the normal mode, the display area operates at a normal frequency by the driving controller, wherein, in the refresh mode, the display area operates at the normal frequency during one frame by the driving controller, and wherein, when the luminance information changes, the display panel operates in the refresh mode.

22. The electronic device of claim 21, wherein, during the multi-frequency mode, the first display area operates at a first driving frequency, and the second display area operates at a second driving frequency lower from the first driving frequency.

23. The electronic device of claim 22, wherein the first driving frequency is identical to the normal frequency, and the second driving frequency is lower than the normal frequency.

24. The electronic device of claim 21, wherein the driving controller includes:

a receiver which receives an image information; and an image processor which receives the luminance information.

25. The electronic device of claim 24, wherein, when the luminance information changes, the image processor changes the luminance value of the display panel.

26. The electronic device of claim 24, wherein, in the normal mode and the refresh mode, the image information corresponding to the display area is provided, and wherein, in the multi-frequency mode, a portion of the image information is provided to the first display area, and a remaining portion of the image information to be provided to the second display area is held.

* * * * *